Patented June 5, 1928.

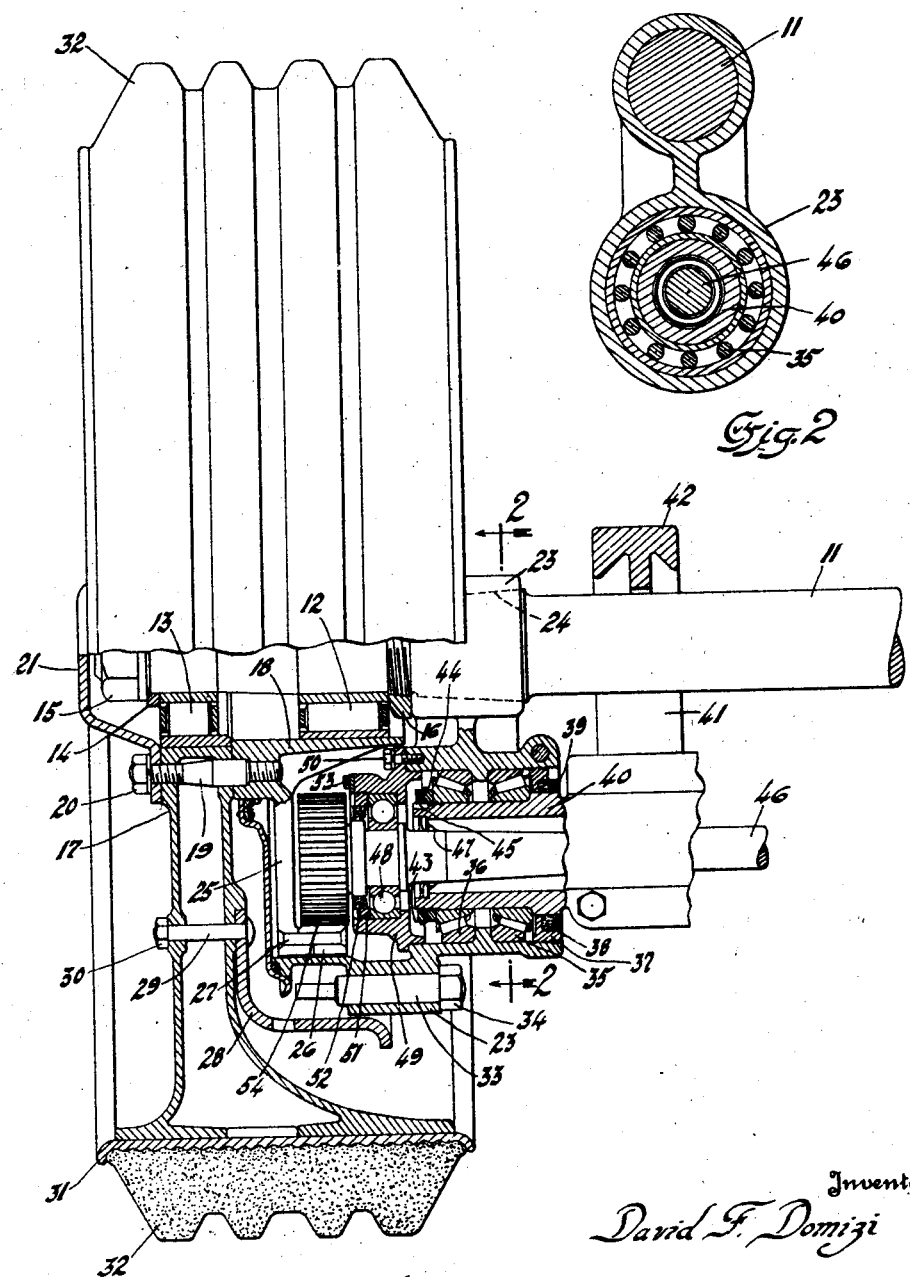

1,672,515

UNITED STATES PATENT OFFICE.

DAVID F. DOMIZI, OF CLEVELAND, OHIO, ASSIGNOR, BY MESNE ASSIGNMENTS, TO RELAY MOTOR PRODUCTS CORPORATION, OF BRIDGEPORT, CONNECTICUT, A CORPORATION OF DELAWARE.

MOTOR-VEHICLE CONSTRUCTION.

Application filed December 18, 1926. Serial No. 155,751.

My invention relates to improvements in the driving mechanism for motor vehicles wherein the weight of the vehicle together with its load may be utilized to assist the forward or rearward rotation of the driving wheels in addition to the torque delivered to them from the vehicle engine.

This invention deals more specifically with a construction whereby the load of the vehicle above the springs, usually known as "sprung load" is transferred to the load carrying dead axle through the medium of antifriction bearings, thus reducing to a minimum any frictional resistance to the function of swinging or climbing necessary to permit the "sprung load" to assist the vehicle engine in moving the vehicle over obstructions encountered.

With the above and other objects in view, my invention consists in the arrangement, combination and construction of the various elements of my improved device as described in the specification, claimed in my claims and depicted in the accompanying drawing, in which:

Fig. 1 is a rear elevation partly in section, of one end of the load carrying axle with its associated wheel, driving gears and drive shaft.

Fig. 2 is a section taken on line 2—2 of Fig. 1.

In the drawings, 11 is the dead or load carrying axle that is constructed in one solid piece throughout its length, the other end being a duplicate to that shown in Fig. 1. On the axle 11 are mounted the antifriction bearings 12 and 13 located laterally between the nut 16 and the washer 14 and nut 15. These bearings 12 and 13 are mounted in the wheel body 17 and hub 18. The wheel body 17 is secured to the wheel hub by the bolts 19 and nuts 20, the same bolts also serving to keep the hub cap 21 in place. The main support casting 23 is secured to the load carrying axle 11, by being drawn up hard on the taper 24 by the nut 16.

Integral with the hub body 18 is the spider 25 to which is secured the internal ring gear 26 by a series of rivets 27, thus allowing the gear and spider to be made of different materials besides providing ready removal for repair or replacement. The brake drum 28 is secured to the wheel body 17 by a series of bolts 29 and nuts 30, thus permitting the brake drum to be of different material than the wheel body. To the wheel body 17 is attached the rim 31 and the road tire 32.

In the main support casting 23 is fixed the brake anchor pin 33, held in place by the nut 34. Internal brake shoes (not shown) are interposed between the casting 23 and the brake drum 28, so that when the brakes are applied by any suitable operating means, their reaction will be applied to the casting 23 through the anchor pin 33.

Mounted in the main support casting are the antifriction bearings 35 and 36 with the collar 37, the felt packing 38 and snap ring 39 protecting them from road dirt and retaining the lubricant. The inner races of these antifriction bearings 35 and 36 are carried on the housing 40 to which are bolted the spring perches 41 that arch or bridge up over the load carrying axle 11 as at 42, where the chassis springs (not shown) are attached. Thus, the weight of the load carried by the chassis springs is transferred through the perch 41 to the housing 40 and thence through the bearings 35 and 36 to the main support casting 23 which is rigidly secured to the load carrying axle 11 as previously described. The bearings 35 and 36 are adjustable relative to each other by means of the nut 43 locking washer 44 and lock nut 45.

Passing through the center of the housing 40 is the drive shaft 46 which does not touch the housing 40 except through the oil retainer 47. The outer end of the drive shaft 46 is carried in the antifriction bearing 48 that is mounted in the bearing carrier 49 which is mounted in the main support casting 23 and held in place by the bolts 50. The outer race of the bearing 48 is held in place by the collar 51 with its oil retaining felt 52 and the nuts 53. On the outer end of the shaft 46 is rigidly attached the driving pinion 54 that meshes with the internal ring gear 26 previously described as being attached to the wheel body.

It will now be seen that when rotative power is applied to the drive shaft 46 from the source of motive power, the rotation will be transferred through the pinion 54 and ring gear 26 and thence to the wheels, exerting tractive effort. The load above the spring perches 41 tends to keep the housing 40 directly below the load carrying axle 11, but when the wheel meets an obstruction to its rolling, it hesitates momentarily while the shaft 46 continues to rotate, and instead of the vehicle being stalled by the obstruction, the pinion 54 starts to climb up around the inside of the ring gear 26 in the proper direction to allow the sprung load to add its downward effort to assist the road wheel to rotate. It will be noted that by the interposition of the antifriction bearings between the housing 40 which carries the spring load, and the main support casting 23 which is rigidly secured to the load carrying axle 11, I have eliminated the dragging friction at this point which has heretofore hindered the proper functioning of the climbing motion just described, thus endowing a vehicle equipped with my device with more ability to overcome road obstacles without exerting undue power from the vehicle engine. The reduction of friction at this point improves the economical operation of the vehicle by a considerable amount.

It will be apparent that I have now devised a novel and useful improvement in a very simple manner. Obviously, changes in detail may be made by one skilled in the art, without departing from the theory of my invention, and I do not care to limit myself to any particular form or arrangement of these elements, other than as expressed in the appended claims.

What I claim is:

1. In combination, a dead axle, a wheel rotatably secured thereto, a support depending from said dead axle, a housing rotatably supported on anti-friction bearings in said support, a bearing carrier removably secured to said support concentrically with said housing, bearings in said carrier, and an axle shaft within said housing rotatably supported by the last named bearings.

2. In combination, a dead axle, a wheel rotatably secured thereto, a support secured to and depending from said dead axle, an opening in said support, a housing rotatably supported at its end within said opening on anti-friction bearings, a bearing carrier removably secured to said support concentrically of said housing, a bearing carried by said bearing carrier and held against axial movement therein, and an axle shaft enclosed by said housing received in the last mentioned bearing and secured against axial movement therein.

3. In combination, a dead axle, a wheel rotatably mounted thereon, a gear on said wheel, a support provided with an opening depending from said axle, a housing rotatably mounted in anti-friction bearings within said opening, a bearing carrier removably secured to said support concentrically of said housing, a bearing carried by said carrier, means for locking said last mentioned bearing against axial movement, an axle shaft enclosed by said housing and received within said last mentioned bearing, said axle shaft being provided with a shoulder, and a pinion secured to said shaft in meshing relationship with said gear, said last mentioned bearing being clamped between said pinion and said shoulder whereby to prevent axial movement of said shaft.

DAVID F. DOMIZI.